…

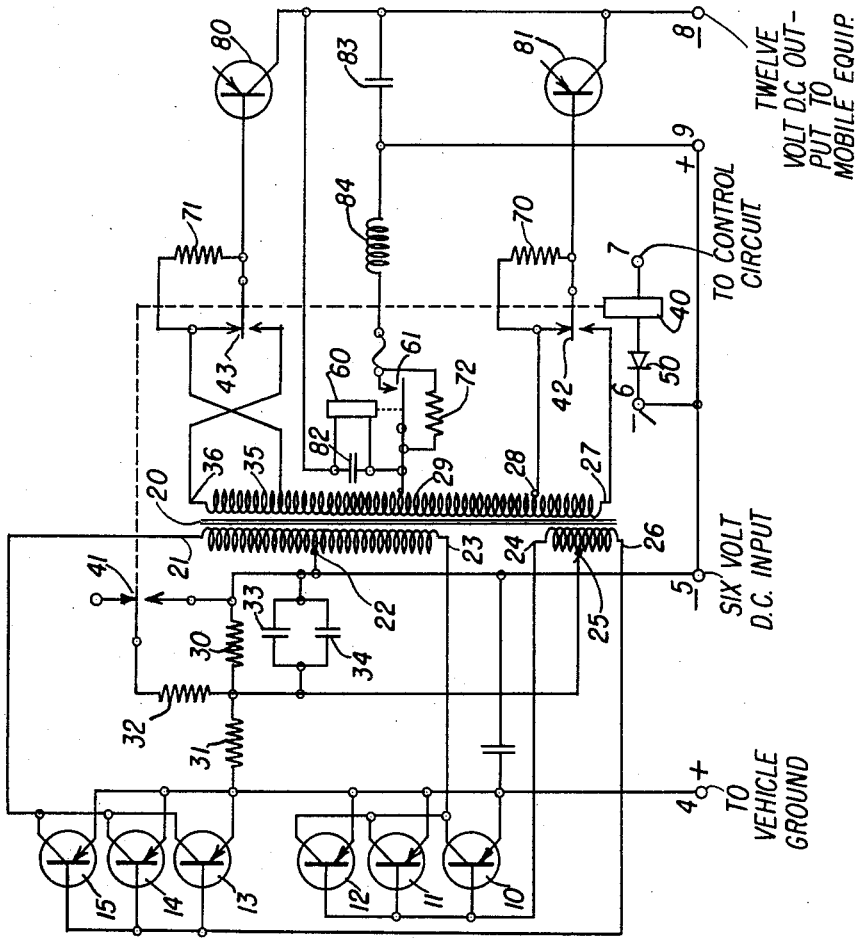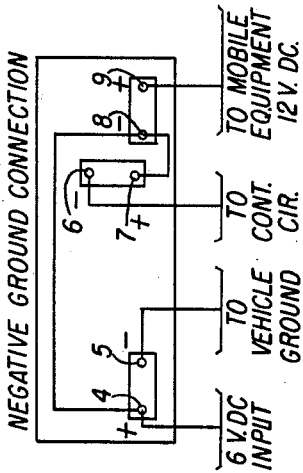

United States Patent Office 3,070,737
Patented Dec. 25, 1962

3,070,737
VOLTAGE CONVERTER
Jerome A. Johnson, Lombard, Ill., and Glen R. Madland, Phoenix, Ariz., assignors to Motorola, Inc., Chicago, Ill., a corporation of Illinois
Filed Jan. 20, 1960, Ser. No. 3,566
7 Claims. (Cl. 321—2)

This invention relates generally to voltage converter power supplies and in particular to a voltage converter that provides a voltage of the order of twice the voltage of the energizing direct current source.

Most vehicles such as trucks and automobiles are now equipped with a twelve volt electrical system and therefore mobile electronic equipment such as radio communication equipment is designed for twelve volt operation. However, there are a number of vehicles in which it is desired to use equipment which have a six volt system. It is therefore desired to provide a converter to provide twelve volts from a six volt source which is of general application so that twelve volt equipment can be used in such vehicles.

Therefore, it is an object of the present invention to provide an improved voltage converter which produces an output voltage which is substantially twice the source voltage.

Another object of the invention is to provide a fully transistorized voltage converter for converting six volts D.C. to twelve volts D.C. which provides the required power with a minimum of equipment.

Another object of the present invention is to provide a voltage converter which is compact, economical, and reliable under varying operating conditions.

A feature of the invention is the provision of a completely transistorized voltage converter circuit for providing twelve volts from a six volt D.C. source wherein the output of the converter can be added to the source voltage so that the converter handles only half the required power.

Another feature of the invention is the provision of a voltage converter wherein the input is isolated from the output and the source voltage can be stacked or added to the converter output voltage to obtain approximately a two-to-one voltage step-up and in which the converter can be used with either positive or negative terminal ground. Still another feature of the invention is the provision of a voltage converter having a transistor oscillator in which the driving voltage supplied to the transistors is limited only by low value resistance, thereby requiring a minimum amount of power and maintaining excellent drive to switching current ratio with changes in the input voltage thus increasing the overall efficiency of the converter circuit.

A still further feature of the invention is the provision of a converter having an anti-stall relay connected to the secondary winding of the transformer thereby preventing current from the input source from flowing into the load until the converter has begun to operate.

FIG. 1 is a schematic diagram of the voltage converter circuit showing terminal connections for a positive ground system; and FIG. 2 shows connections of the converter for negative ground.

In practicing the invention, a voltage converter is provided including a transistor switching circuit, a transformer, and a rectifier circuit connected to the secondary side of the transformer. The converter output voltage is isolated from the input so that it may be stacked or added in series to the source voltage. Stacking or adding of the voltages to either polarity of the source is possible because of isolation provided by the transformer. A plurality of high power transistors are connected in the electronic switching circuit which is basically a multivibrator. Anti-stall relay is connected to the secondary side of the transformer. This relay coil is energized by voltage from the secondary winding after the converter switching circuit has begun to operate. Contacts on the relay are in series with the load and when the contacts close, the voltage output of the converter is applied to the load.

Referring now to FIG. 1, transistors 10, 11 and 12 are connected as one bank and transistors 13, 14 and 15 are connected as a second bank, with both banks being connected to transformer 20. The center tap 25 of the feedback winding connects through starting resistor 30 to terminal 5, the negative side of the input, and through feedback resistor 31 to the positive side of the input terminal 4. Initial drive current flows through starting resistor 30 only, with added drive being provided by current through feedback resistor 31 after the oscillation cycle of the transistor swtiching circuit has started. Capacitors 33 and 34 are spike reduction capacitors which improve the primary voltage waveform by providing a low impedance source for the feedback bias voltage. When additional output power is needed, during operation of a radio transmitter for example, the drive is increased further by decreasing the value of the starting resistance by connecting resistors 30 and 32 in parallel, when relay 40 is actuated.

The D.C. path of the input voltage is through the center tap 22 of the transformer 20 primary winding and to the transistor banks. One transistor bank is connected to one end 21 of the primary winding and the other transistor bank is connected to the other end 23 of the primary winding. A slight unbalance in transistor conductivity causes more current to flow through one primary half winding than through the other primary half winding. Thus, the current path is through the primary half winding and the transistors to positive terminal 4 of the D.C. input. Current in the transformer half winding induces voltages in the two feedback half windings 24—25 and 25—26. The polarity of this induced voltage is such that the more heavily conducting transistor bank is quickly biased to full conduction and the other transistor bank is quickly driven to cut-off. Induced feedback voltage drops to zero as the current through the conducting transistor bank reaches the point of saturating the core of transformer 20, and the loop gain of the oscillator is reduced to less than unity. When the loop gain of the oscillator is reduced to less than unity the stored inductive energy in transformer 20 produces a voltage reversal and the transistor bank which was cut off begins to conduct. Conduction through this transistor bank increases and greater feedback bias is induced to quickly cut off the first transistor bank. Current through the second transistor bank then reaches the point of core saturation, and a cycle of oscillation is complete. The circuitry is designed for self-sustaining, continuous oscillation as long the D.C. input voltage is applied. The current alternates between the two primary half windings 21—22 and 22—23 as one transformer bank conducts to the point of core saturation and then the other bank conducts to the point of core saturation. The voltage induced in the transformer approximates that of a typical square wave pattern.

The secondary winding of power transformer 20 provides an A.C. voltage which is high enough to insure proper output voltage after rectification. The secondary winding is connected through contacts 42 and 43 of relay 40 to a rectifier and filter circuit to be described. The contacts are shown in their normal position when relay 40 is deenergized and voltage is being provided from taps 35 and 28 of the secondary winding. The full secondary winding 27—36 of the transformer is used whenever increased output voltage is required. Relay 40 is energized when the converter output voltage must be increased. Diode 50 is series with the relay coil prevents current flow from the associated control circuitry in the mobile unit during normal operation of the converter.

The rectifier filter network converts the A.C. induced in the transformer secondary to a smooth D.C. output required for operation of mobile electronic equipment. The network consists of a full wave center-tapped rectifier circuit that uses two transistors 80 and 81 connected as diodes and a pi section filter consisting of capacitors 82 and 83 and choke 84. It will be obvious that other rectifier devices and other filter circuits may be used.

Relay 60 is a six volt D.C. relay with the relay coil connected to the rectified output of the converter. Relay 60 connects the external load to the converter circuit after oscillation has started in the transistor circuit in the primary winding. This relay also prevents input voltage from flowing through the load into the secondary winding and saturating the transformer core.

Resistors 70 and 71 are shunted across contacts 42 and 43 of relay 40 and resistor 72 is shunted across contact 61 of relay 60 to provide voltage to the load during the change-over period from normal to increased voltage output. These resistors prevent the load equipment from stalling due to loss of voltage caused by the time lag when switching from the normal voltage to increased voltage condition.

Terminal connections shown in FIG. 1 are for a positive ground system. Terminal 4 is connected to the vehicle ground. Terminal 5 is connected to the six volt D.C. input and terminals 5 and 9 are connected in common to provide a twelve volt D.C. output at terminal 8 to the mobile equipment. Terminal 7 is connected to a control circuit which grounds this terminal when the load increases, and as terminal 6 is connected to the six volt input the relay 40 will be operated.

In FIG. 2 the terminal connections for a negative ground system are shown. The input voltage of 6 volts D.C. is applied at terminals 4 and 5. Terminal 4 is connected to terminal 8 of the converter and terminal 9 is connected to the mobile equipment load. Terminal 8 is also connected to terminal 7 of the control relay and terminal 6 is connected to the control circuit which is grounded under increased load conditions. This operates relay 40 (FIG. 1) to increase the output voltage. The input and output voltages are added to provide a total output of 12 volts D.C.

The invention, therefore, provides a fully transistorized voltage converter for converting six volts D.C. to twelve volts D.C. with either positive or negative ground. The circuit is compact, economical, and operates under the most adverse conditions encountered in mobile equipment use. As only half of the power used goes through the converter, the capacity and therefore the cost is held to a minimum and the overall efficiency is increased.

We claim:

1. A direct current voltage converter circuit including in combination, a saturable core transformer having isolated primary and secondary windings, first and second terminals for connection to an input voltage source, first and second transistor switching circuits coupled to a primary winding of said transformer, rectifying means coupled to the secondary winding of said transformer, first and second output voltage terminals coupled to said rectifying means, means for connecting said input and output terminals whereby the source voltage is added to the output voltage, and first and second relay means, said first relay means being actuated by an external control circuit causing an increase in output voltage and said second relay means coupling an external load to said converter circuit after the transistor switching circuit is operating, thereby preventing the input voltage from saturating said transformer through the load when input voltage is initially applied to the converter circuit.

2. A direct current voltage converter circuit including in combination, a power transformer having isolated primary and secondary windings, means coupling said primary winding to one of first and second input voltage terminals, first and second transistor switch circuits coupled to said transformer primary winding, means connecting said switch circuits to the other one of said input voltage terminals, rectifying means including relay means coupled to said transformer secondary winding, said rectifying means converting a pulsating current voltage induced in said transformer by said transistor switch circuits to a direct current output voltage, and means for applying said output voltage in series with said input voltage to a load, said relay means being actuated by said output voltage to apply said output voltage and said input voltage to a load.

3. A direct current voltage converter circuit including first and second terminals for connection to an input source, a transistor switching circuit coupled to said first input terminal, a transformer including isolated primary and secondary windings with the primary winding coupled to said switching circuit and said second input terminal, rectifying means coupled to said transformer secondary winding having first and second output terminals, first relay means coupled between said output terminals and a load, second relay means coupled between transformer and an external control circuit, and means connecting one of said input terminals to the output terminal of opposite polarity, whereby upon actuation of said transistor switching circuit said first relay means becomes energized and causes the voltage of said rectifying means to be added to the voltage of the source and applied to a load connected between the other input terminal and the output terminal of opposite polarity thereto, said second relay means being actuated by said external control circuit thereby increasing the voltage of said rectifying means.

4. A direct current voltage converter circuit including first and second terminals for connection to an input source, a transistor switching circuit connected to one input terminal, a transformer including isolated primary and secondary windings with the primary winding connected to said switching circuit, rectifying means coupled to said secondary winding of said transformer having first and second output terminals, a relay connected to said transformer secondary winding and in series with an external load, and means connecting one of said input terminals to the output terminal of opposite polarity, said relay being energized after said switching circuit is operating thereby causing the output voltage of said rectifying means to be added to the voltage of the source and applied to an external load connected between the other input terminal and the output terminal of opposite polarity thereto.

5. A direct current voltage converter including first and second input terminals for connection to an input supply source, a transistor switching circuit, a saturable core transformer including isolated primary, secondary and feedback windings, said transistor switching circuit being coupled between said primary winding and said first input terminal and being further coupled to said feedback winding, said feedback winding controlling the switching action of said switching circuit, said primary winding being coupled to said second input terminal, rectifying means coupled to said secondary winding having first and second output terminals, means connecting one of said input terminals to the output terminal of opposite polarity whereby the voltage of said rectifying means is added to the voltage of the source and is developed between the other input terminal and the output terminal of opposite polarity thereto, first and second resistors connected in series between said first and second input terminals and means connecting the common junction between said first and second resistors to said feedback winding, said resistors acting to control the switching current applied to said transistor switching circuit by said feedback winding whereby said switching current is increased upon the actuation of said switching circuit.

6. A direct current voltage converter including in combination, first and second input supply terminals for connection to an input supply source, a transformer including isolated primary, secondary and feedback windings with said windings each having a center tap, a transistor switching circuit coupled between said first input supply terminal and said primary winding, said feedback winding being coupled to said transistor switching circuit and controlling the switching action thereof, said second input supply terminal being connected to said center tap of said primary winding, rectifying means coupled to said secondary winding having first and second output voltage terminals to be connected to a load, relay means, and circuit means coupled between said first and second input supply terminals and to said switching circuit for applying a switching current thereto to start and sustain the switching action of said transistor switching circuit, said circuit means including means to increase said switching current upon the actuation of said switching circuit, said relay means having portions coupled to said secondary winding and to said circuit means, said relay means being operable to increase the output voltage and to increase said switching current for said switching circuit thereby increasing the drive therefor.

7. A direct current voltage converter including in combination, first and second input supply terminals for connection to an input supply source, a transformer including isolated primary, secondary and feedback windings with said windings each having a center tap, first and second transistor switching circuits coupled between said first input supply terminal and said primary winding and being further coupled to said feedback winding, said feedback winding controlling the switching action of said transistor switching circuits, said second input supply terminal being connected to said center tap of said primary winding, rectifying means coupled to said secondary winding having first and second output voltage terminals adapted to be connected to a load, circuit means to provide the switching current to start and sustain the switching action of said transistor switching circuits, said circuit means including first, second and third resistor means, with said first and second resistor means being series connected between said first and second input supply terminals, said center tap of said feedback winding being coupled to the juncture between said first and second resistor means to effectively increase said switching current upon the actuation of said transistor switching circuits, and relay means including a portion coupled to said secondary winding to increase the output voltage, said relay means selectively connecting said third resistor means across said second resistor means to further increase said switching current for said transistor switching circuits.

References Cited in the file of this patent

UNITED STATES PATENTS

| 2,798,160 | Bruck et al. | July 2, 1957 |
| 2,950,446 | Humez et al. | Aug. 23, 1960 |

FOREIGN PATENTS

| 740,128 | Germany | Oct. 13, 1943 |